United States Patent
Yamaoka et al.

(10) Patent No.: US 11,250,707 B2
(45) Date of Patent: Feb. 15, 2022

(54) COLLISION AVOIDANCE ASSISTANCE DEVICE

(71) Applicant: Toyota Jidosha Kabushiki Kaisha, Toyota (JP)

(72) Inventors: Masaaki Yamaoka, Tokyo (JP); Yoshinori Watanabe, Isehara (JP); Naotoshi Kadotani, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/600,906

(22) Filed: Oct. 14, 2019

(65) Prior Publication Data
US 2020/0184821 A1  Jun. 11, 2020

(30) Foreign Application Priority Data
Dec. 7, 2018 (JP) .............................. JP2018-229976

(51) Int. Cl.
*B60W 30/09* (2012.01)
*B60W 30/095* (2012.01)
*G08G 1/16* (2006.01)
*B60W 40/02* (2006.01)

(52) U.S. Cl.
CPC ............. *G08G 1/166* (2013.01); *B60W 30/09* (2013.01); *B60W 30/0956* (2013.01); *B60W 40/02* (2013.01); *G08G 1/165* (2013.01); *B60W 2554/804* (2020.02)

(58) Field of Classification Search
CPC ............. B60W 30/09; B60W 30/0956; B60W 2552/30; G08G 1/165; G08G 1/166
See application file for complete search history.

(56) References Cited

U.S. PATENT DOCUMENTS 7,835,865 B2 * 11/2010 Okazaki ................ B60W 10/18
                                                      701/300
2008/0266168 A1   10/2008 Aso et al.
(Continued)

FOREIGN PATENT DOCUMENTS

| JP | 2007-233645 A | 9/2007 |
| JP | 2007-233646 A | 9/2007 |

(Continued)

*Primary Examiner* — Anshul Sood
(74) *Attorney, Agent, or Firm* — Dinsmore & Shohl LLP

(57) ABSTRACT

A collision avoidance assistance device includes a road shape recognition unit that recognizes a road shape of a traveling road, a path estimation unit that estimates a path of the host vehicle based on the road shape, an obstacle situation recognition unit recognizes an obstacle situation surrounding the host vehicle including at least a relative position of the obstacle with respect to the host vehicle, an early avoidance assistance determination unit that determines a need for early avoidance assistance for avoiding collision between the host vehicle and the obstacle from a distance between the host vehicle and the obstacle on the path of the host vehicle based on the path of the host vehicle and the obstacle situation, and a collision avoidance assistance execution unit executes the early avoidance assistance in a case where the early avoidance assistance determination unit determines that the early avoidance assistance is needed.

3 Claims, 6 Drawing Sheets

(56) References Cited

U.S. PATENT DOCUMENTS

| | | | |
|---|---|---|---|
| 2011/0246071 A1* | 10/2011 | Tsunekawa | G08G 1/166 |
| | | | 701/301 |
| 2014/0188350 A1* | 7/2014 | Popham | B60W 50/085 |
| | | | 701/49 |
| 2014/0303883 A1 | 10/2014 | Aso et al. | |
| 2016/0328974 A1* | 11/2016 | Yoshizawa | B60W 30/09 |
| 2019/0016316 A1* | 1/2019 | Sung | G01S 13/867 |
| 2019/0263344 A1* | 8/2019 | Yokoi | B60W 30/09 |
| 2020/0324748 A1* | 10/2020 | Hiraga | B60T 8/26 |

FOREIGN PATENT DOCUMENTS

| | | |
|---|---|---|
| JP | 2007-233764 A | 9/2007 |
| JP | 2009-026321 A | 2/2009 |
| JP | 2011-204124 A | 10/2011 |

* cited by examiner

COLLISION AVOIDANCE ASSISTANCE DEVICE

CROSS-REFERENCE TO RELATED APPLICATIONS

This application claims priority to Japanese Patent Application No. 2018-229976 filed on Dec. 7, 2018, which is incorporated herein by reference in its entirety including the specification, drawings and abstract.

BACKGROUND

1. Technical Field

The present disclosure relates to a collision avoidance assistance device.

2. Description of Related Art

In the related art, as technical literature relating to a collision avoidance assistance device, Japanese Unexamined Patent Application Publication No. 2011-204124 (JP 2011-204124 A) is known. The publication describes a device that estimates a trajectory, on which a host vehicle travels, based on change in direction, position, or the like of the host vehicle, estimates a trajectory, on which another moving object moves, and detects a collision possibility between the host vehicle and another moving object based on the estimated trajectory of the host vehicle and the estimated trajectory of another moving object.

SUMMARY

However, in a case where a road shape, on which the host vehicle travels, changes, or the like, it may not be possible to estimate an accurate path (future traveling trajectory) of the host vehicle solely with change in direction, position, or the like of the host vehicle. With this, for example, in order to avoid the occurrence of erroneous collision avoidance assistance of the host vehicle with respect to a parked vehicle positioned outside a curve (outside a road) in front of the host vehicle when the host vehicle enters the curve, there is a need to strictly set a condition for assistance of collision avoidance, and early assistance is hardly executed. For this reason, it is desirable to execute more appropriate assistance of collision avoidance.

An aspect of the disclosure relates to a collision avoidance assistance device that executes assistance of collision avoidance between a host vehicle and an obstacle during traveling of the host vehicle based on a driving operation of a driver. The collision avoidance assistance device includes a road shape recognition unit, a path estimation unit, an obstacle situation recognition unit, an early avoidance assistance determination unit, and a collision avoidance assistance execution unit. The road shape recognition unit is configured to recognize a road shape of a traveling road, on which the host vehicle travels. The path estimation unit is configured to estimate a path of the host vehicle based on the road shape. The obstacle situation recognition unit is configured to recognize an obstacle situation surrounding the host vehicle including at least a relative position of the obstacle with respect to the host vehicle. The early avoidance assistance determination unit is configured to determine a need for early avoidance assistance for avoiding collision between the host vehicle and the obstacle from a distance between the host vehicle and the obstacle on the path of the host vehicle based on the path of the host vehicle and the obstacle situation. The collision avoidance assistance execution unit is configured to execute the early avoidance assistance in a case where the early avoidance assistance determination unit determines that the early avoidance assistance is needed.

In the collision avoidance assistance device according to the aspect of the disclosure, the road shape of the traveling road, on which the host vehicle travels, is recognized, and the path of the host vehicle is estimated based on the road shape. For this reason, it is possible to improve the estimation accuracy of the path of the host vehicle and to appropriately execute the early avoidance assistance compared to a case in the related art without taking the road shape into consideration. Furthermore, in the collision avoidance assistance device, the estimation accuracy of the path of the host vehicle is improved taking the road shape into consideration, whereby erroneous assistance of collision avoidance of the host vehicle to an obstacle or the like outside the traveling road is suppressed. For this reason, it is also possible to execute early assistance while relaxing a determination condition compared to the related art.

The collision avoidance assistance device according to the aspect of the disclosure may further include an emergency avoidance assistance determination unit configured to determine a need for emergency avoidance assistance from a distance between the obstacle and the host vehicle in a front-rear direction of the host vehicle based on the obstacle situation. The collision avoidance assistance execution unit may be configured to execute the emergency avoidance assistance in a case where the emergency avoidance assistance determination unit determines that the emergency avoidance assistance is needed. A distance between the host vehicle and the obstacle when the emergency avoidance assistance determination unit determines that the emergency avoidance assistance is needed may be a distance when the early avoidance assistance determination unit determines that the early avoidance assistance is needed in a case where a relative speed between the host vehicle and the obstacle is the same. With the collision avoidance assistance device, the need for the emergency avoidance assistance is determined, and in a case where determination is made that the emergency avoidance assistance is needed, the emergency avoidance assistance is executed. For this reason, it is possible to execute the emergency avoidance assistance to appropriately assist the collision avoidance when another vehicle or the like suddenly runs out in front of the host vehicle.

In the collision avoidance assistance device according to the aspect of the disclosure, in a case where the road shape is a branch road or an intersection, the collision avoidance assistance execution unit may be configured to prohibit the execution of the early avoidance assistance regardless of a determination result of the early avoidance assistance determination unit. With the collision avoidance assistance device, on a branch road or at an intersection that affects the path estimation of the host vehicle from the road shape, the early avoidance assistance is not executed, whereby it is possible to suppress execution of erroneous early avoidance assistance.

The collision avoidance assistance device according to the aspect of the disclosure may further include a line-of-sight detection unit configured to detect a line of sight of the driver. In a case where the road shape is a branch path or an intersection, the path estimation unit may be configured to estimate the path of the host vehicle based on the line of sight of the driver. With the collision avoidance assistance device, the line of sight of the driver is detected even in the branch road or the intersection, whereby it is possible to perform the path estimation of the host vehicle. For this reason, it is possible to appropriately determine the need for the early avoidance assistance.

With the collision avoidance assistance device according to the aspect of the disclosure, it is possible to appropriately execute the early avoidance assistance for avoiding collision between the host vehicle and the obstacle based on the path of the host vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
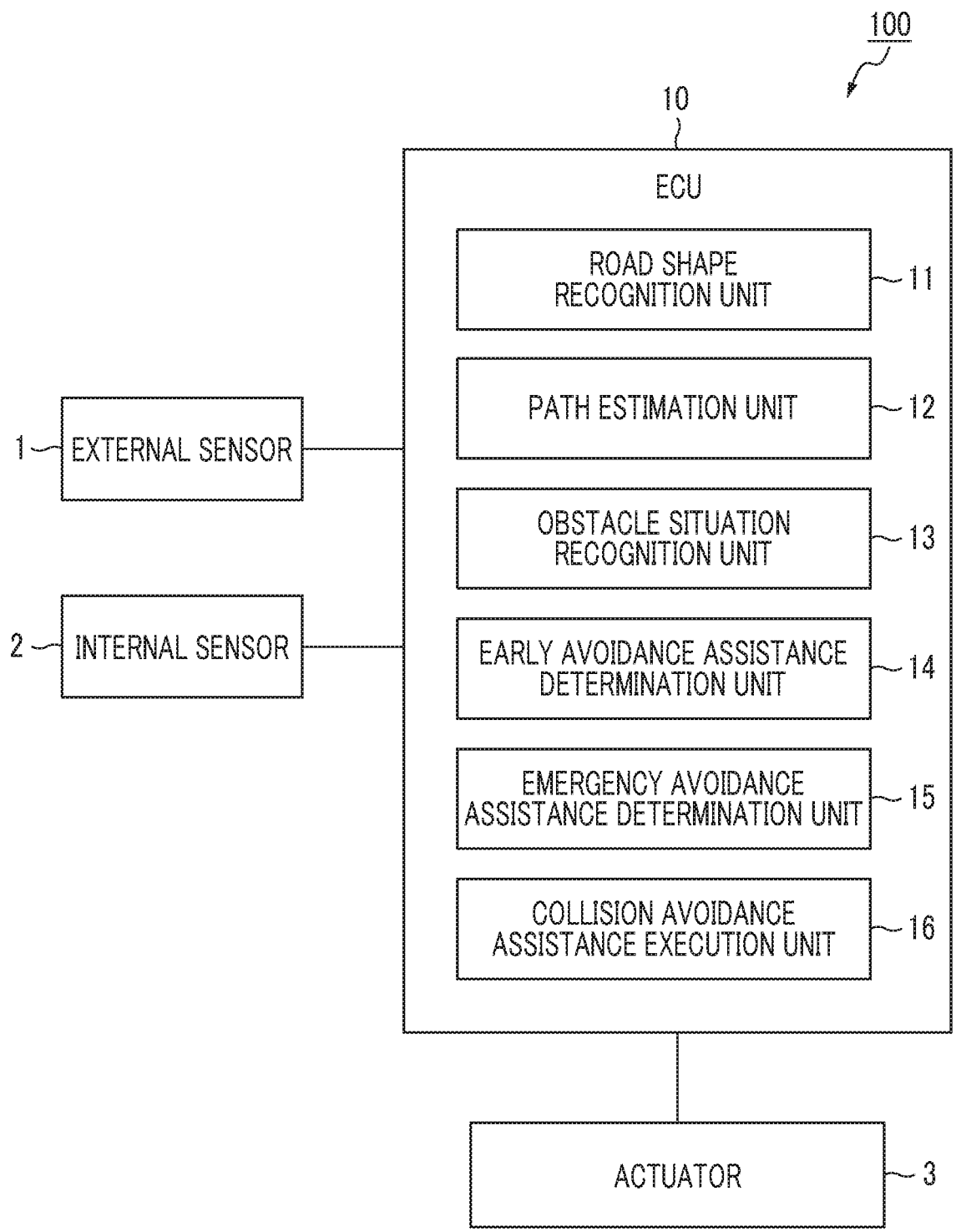
FIG. 1 is a block diagram showing a collision avoidance assistance device according to a first embodiment.

Hereinafter, an embodiment will be described referring to the drawings.

First Embodiment

FIG. 1 is a block diagram showing a collision avoidance assistance device 100 according to a first embodiment. The collision avoidance assistance device shown in FIG. 1 is mounted in a host vehicle, such as a passenger vehicle, and executes collision avoidance assistance for avoiding collision between the host vehicle and an obstacle. The collision avoidance assistance is executed during a driving operation of a driver on the host vehicle. In the collision avoidance assistance, for example, early avoidance assistance and emergency avoidance assistance are included. Details of the early avoidance assistance and the emergency avoidance assistance will be described below.

Configuration of Collision Avoidance Assistance Device in First Embodiment

As shown in FIG. 1, the collision avoidance assistance device 100 in the first embodiment includes an electronic control unit [ECU] 10 that integrally manages the device. The ECU 10 is an electronic control unit having a central processing unit [CPU], a read only memory [ROM], a random access memory [RAM], and the like. In the ECU 10, for example, a program stored in the ROM is loaded to the RAM, and the program loaded to the RAM is executed on the CPU, whereby various functions are implemented. The ECU 10 may be constituted of a plurality of electronic units.

The ECU 10 is connected to an external sensor 1, an internal sensor 2, and an actuator 3.

The external sensor 1 is detection equipment that detects a situation surrounding the host vehicle. The external sensor 1 includes at least one of a camera and a radar sensor.

The camera is imaging equipment that images a situation outside the host vehicle. The camera is provided, for example, on a rear side of a windshield of the host vehicle, and images in front of the host vehicle. The camera transmits imaging information relating to the situation outside the host vehicle to the ECU 10. The camera may be a monocular camera or may be a stereo camera.

The radar sensor is detection equipment that detects an object surrounding the host vehicle using an electric wave (for example, a millimeter wave) or light. In the radar sensor, for example, a millimeter wave radar or light detection and ranging [LIDAR] is included. The radar sensor transmits an electric wave or light to the surrounding of the host vehicle and receives an electric wave or light reflected from an object, thereby detecting an obstacle. The radar sensor transmits a detection result of the detected obstacle to the ECU 10. In the obstacle, in addition to a fixed obstacle, such as a guardrail or a building, a moving obstacle, such as a pedestrian or a bicycle, or other vehicles, is included.

The internal sensor 2 is detection equipment that detects a traveling state of the host vehicle. The internal sensor 2 includes a vehicle speed sensor, an acceleration sensor, and a yaw rate sensor. The vehicle speed sensor is a detector that detects a speed of the host vehicle. As the vehicle speed sensor, for example, a wheel speed sensor that is provided in a wheel of the host vehicle, a drive shaft rotating integrally with the wheel, or the like and detects a rotation speed of the wheel is used. The vehicle speed sensor transmits detected vehicle speed information (wheel speed information) to the ECU 10. The ECU 10 may not necessarily be connected to the internal sensor 2.

The acceleration sensor is a detector that detects an acceleration of the host vehicle. The acceleration sensor includes, for example, a longitudinal acceleration sensor that detects an acceleration in a front-rear direction of the host vehicle and a lateral acceleration sensor that detects a lateral acceleration of the host vehicle. For example, the acceleration sensor transmits acceleration information of the host vehicle to the ECU 10. The yaw rate sensor is a detector that detects a yaw rate (rotational angular velocity) of the center of gravity of the host vehicle around a vertical axis. As the yaw rate sensor, for example, a gyro sensor can be used. The yaw rate sensor transmits detected yaw rate information of the host vehicle to the ECU 10.

The actuator 3 is equipment that is used for control of the host vehicle. The actuator 3 includes at least a drive actuator, a brake actuator, and a steering actuator. The drive actuator controls a supply amount (throttle valve opening degree) of air to an engine in response to a control signal from the ECU 10, and controls drive power of the host vehicle. In a case where the host vehicle is a hybrid vehicle, in addition to the supply amount of air to the engine, a control signal from the ECU 10 is input to a motor as a power source and the drive power is controlled. In a case where the host vehicle is an electric vehicle, a control signal from the ECU 10 is input to a motor as a power source and the drive power is controlled. In these cases, the motor as a power source constitutes the actuator 3.

The brake actuator controls a brake system in response to a control signal from the ECU 10, and controls braking force to be given to the wheels of the host vehicle. As the brake system, for example, a hydraulic brake system can be used. The steering actuator controls the drive of an assist motor configured to control steering torque in an electric power steering system in response to a control signal from the ECU 10. With this, the steering actuator controls steering torque of the host vehicle.

Next, the functional configuration of the ECU 10 will be described. The ECU 10 has a road shape recognition unit 11, a path estimation unit 12, an obstacle situation recognition unit 13, an early avoidance assistance determination unit 14, an emergency avoidance assistance determination unit 15, and a collision avoidance assistance execution unit 16.

The road shape recognition unit 11 recognizes a road shape of a traveling road, on which the host vehicle is traveling. The road shape recognition unit 11 recognizes the road shape of the traveling road, for example, based on a detection result of the external sensor 1. The road shape recognition unit 11 recognizes the road shape of the traveling road from white line recognition using a captured image in front of the host vehicle obtained by the camera or a result of the radar sensor. In the road shape, a curvature of a road is included. The road shape recognition unit 11 may recognize the road shape using a position of the host vehicle on a map obtained by an in-vehicle global positioning system [GPS] receiver or the like and map information.

The road shape recognition unit 11 determines whether or not the road shape, on which the host vehicle travels, is a branch road or an intersection. The road shape recognition unit 11 determines whether or not the road shape is a branch road or an intersection based on the recognized road shape. The road shape recognition unit 11 may determine that the road shape, on which the host vehicle travels, is a branch road or an intersection in a case where a road shape within a given range from the host vehicle in front of the host vehicle is a branch road or an intersection.

The path estimation unit 12 estimates a path of the host vehicle. The path of the host vehicle is a future trajectory, on which the host vehicle travels. The path estimation unit 12 estimates the path of the host vehicle based on the road shape detected by the road shape recognition unit 11. The path estimation unit 12 estimates the path assuming that the host vehicle travels along the traveling road. As an example, the path estimation unit 12 may estimate the path such that the host vehicle passes through a center position of the traveling road in a road width direction. The path estimation unit 12 may estimate the path such that the host vehicle passes through a position offset from the center position by a given distance right and left, instead of the center position of the traveling road in the road width direction. The path of the host vehicle may have a given path width or may have a path width according to the vehicle width of the host vehicle.

The path estimation unit 12 may estimate the path of the host vehicle based on a detection result of the internal sensor 2, in addition to the road shape. The path estimation unit 12 may estimate the path of the host vehicle based on a vehicle state, such as the yaw rate of the host vehicle. The path estimation unit 12 may estimate the path of the host vehicle based on the detection result of the external sensor 1, in addition to the road shape. The path estimation unit 12 may estimate the path of the host vehicle based on a positional relationship between a division line recognized from the captured image of the camera and the host vehicle. The path estimation unit 12 may estimate the path of the host vehicle using both of the detection result of the internal sensor 2 and the detection result of the external sensor 1, in addition to the road shape.

The obstacle situation recognition unit 13 recognizes an obstacle situation surrounding the host vehicle based on the detection result of the external sensor 1 (the captured image of the camera or the detection result of the radar sensor). In the obstacle situation, a relative position of an obstacle with respect to the host vehicle is included. In the obstacle situation, a moving direction of the obstacle with respect to the host vehicle may be included or a relative speed of the obstacle with respect to the host vehicle may be included.

The early avoidance assistance determination unit 14 determines a need for early avoidance assistance for avoiding collision between the host vehicle and the obstacle in a case where the road shape recognition unit 11 determines that the road shape that the host vehicle enters is not a branch road and an intersection.

The early avoidance assistance determination unit 14 determines the need for the early avoidance assistance based on the path of the host vehicle estimated by the path estimation unit 12 and the obstacle situation recognized by the obstacle situation recognition unit 13. The early avoidance assistance determination unit 14 determines the need for the early avoidance assistance from the distance between the host vehicle and the obstacle on the path of the host vehicle.

The early avoidance assistance is driving assistance for avoiding collision between the host vehicle and the obstacle. The early avoidance assistance determines the need based on the path of the host vehicle, thereby executing assistance earlier than the case in the related art where solely the distance between the host vehicle and the obstacle or a time to collision [TTC] is used.

The early avoidance assistance determination unit 14 determines that the early avoidance assistance is needed, for example, in a case where the distance between the host vehicle and the obstacle on the path of the host vehicle becomes less than a first distance threshold. The early avoidance assistance determination unit 14 determines that the early avoidance assistance is not needed in a case where the distance between the host vehicle and the obstacle on the path of the host vehicle is equal to or greater than the first distance threshold. The first distance threshold is a threshold of a value set in advance. The value of the first distance threshold may be changed depending on the vehicle speed of the host vehicle, or the like or may become a greater value when the vehicle speed of the host vehicle is higher.

The early avoidance assistance determination unit 14 may use the time to collision between the host vehicle and the obstacle on the path of the host vehicle, instead of the distance between the host vehicle and the obstacle on the path of the host vehicle. The early avoidance assistance determination unit 14 determines that the early avoidance assistance is needed, for example, in a case where the distance between the host vehicle and the obstacle on the path of the host vehicle becomes a first TTC threshold. The early avoidance assistance determination unit 14 determines that the early avoidance assistance is not needed in a case where the distance between the host vehicle and the obstacle on the path of the host vehicle is equal to or greater than the first TTC threshold. The first TTC threshold is a threshold of a value set in advance. In addition, the early avoidance assistance determination unit 14 may perform determination using a time headway [THW] between the host vehicle and the obstacle on the path of the host vehicle.

Figure 2A:
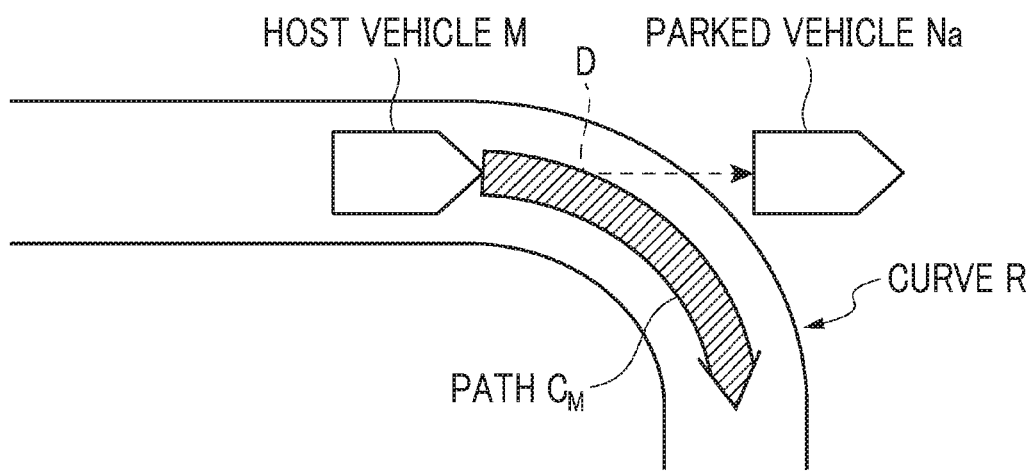
FIG. 2A is a plan view showing a case where a parked vehicle is present outside a path in front of a host vehicle.

FIG. 2A is a plan view showing a case where a parked vehicle is present outside the path in front of the host vehicle. FIG. 2A shows a curve R, a host vehicle M, a path $C_M$, a parked vehicle (obstacle) Na, and a distance D between the host vehicle M and the parked vehicle Na in the front-rear direction of the host vehicle M. In FIG. 2A, the parked vehicle Na is present at a position deviated from the curve R that the host vehicle M enters in front of the host vehicle M.

In a situation shown in FIG. 2A, in the device of the related art, the need for assistance is determined from the distance D between the host vehicle M and the parked vehicle Na without taking the path $C_M$ of the host vehicle M into consideration. For this reason, unneeded assistance may be executed with respect to the parked vehicle Na deviated from the curve R (road). In the device of the related art, in order to avoid the execution of such unneeded assistance, there is a need to set a determination condition such that determination is made that assistance is needed solely in a case where the host vehicle M and the parked vehicle Na sufficiently approach each other. In contrast, the early avoidance assistance determination unit 14 determines the need for the early avoidance assistance taking the path $C_M$ of the host vehicle M into consideration in the situation shown in FIG. 2A. For this reason, it is possible to avoid unneeded assistance with respect to the parked vehicle Na positioned outside the curve R that the host vehicle M enters.

Figure 2B:
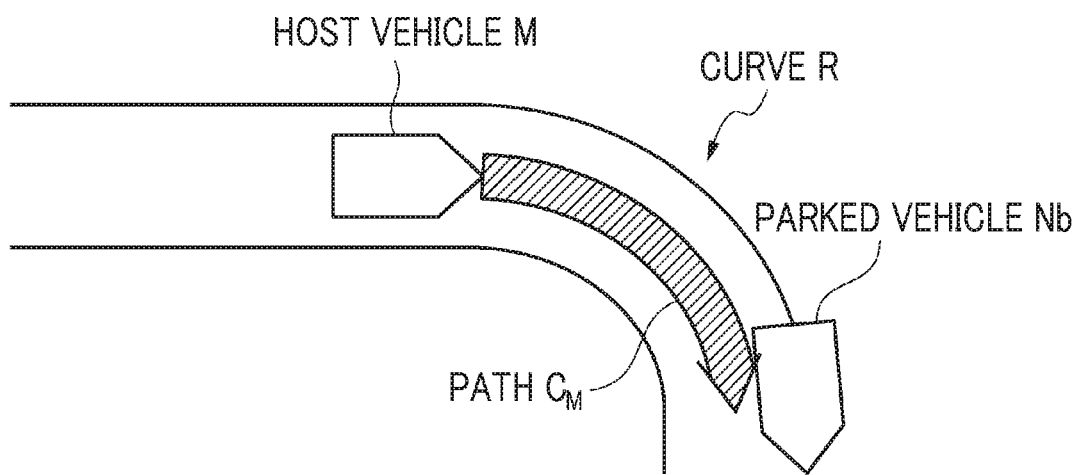
FIG. 2B is a plan view showing a case where a parked vehicle is present on a path of the host vehicle.

Subsequently, FIG. 2B is a plan view showing a case where a parked vehicle Nb is present on the path $C_M$ of the host vehicle M. The parked vehicle Nb shown in FIG. 2B is parked at a position inside the curve R, and is positioned on the path $C_M$ of the host vehicle M that enters the curve R. In the situation shown in FIG. 2B, in the device of the related art, the parked vehicle Nb that is not positioned in front of the host vehicle M may not be exempted from determination of a need for assistance. In the device of the related art, even though the parked vehicle Nb is subjected to determination of a need for assistance, in order to avoid unneeded assistance as described above, the determination condition is set such that determination is made that assistance is needed solely in a case where the host vehicle M and the parked vehicle Na sufficiently approach each other, and it is not possible to start assistance early.

In contrast, in the early avoidance assistance determination unit 14, the need for the early avoidance assistance is determined taking the path $C_M$ of the host vehicle M into consideration in the situation shown in FIG. 2B. For this reason, it is possible to perform the determination of the need under a condition relaxed compared to the related art, and to perform the determination of the need for the early avoidance assistance early with respect to the parked vehicle Nb positioned on the path $C_M$ of the host vehicle M.

The emergency avoidance assistance determination unit 15 determines a need for emergency avoidance assistance for avoiding collision between the host vehicle M and the obstacle based on the obstacle situation. The emergency avoidance assistance determination unit 15 determines the need for the emergency avoidance assistance from the distance between the host vehicle M and the obstacle in the front-rear direction of the host vehicle M without using the path $C_M$ of the host vehicle M. The emergency avoidance assistance will be described. The distance between the host vehicle M and the obstacle when the emergency avoidance assistance determination unit 15 determines that the emergency avoidance assistance is needed is a distance shorter than the distance when the early avoidance assistance determination unit 14 determines that the early avoidance assistance is needed in a case where a relative speed between the host vehicle M and the obstacle is the same.

The emergency avoidance assistance determination unit 15 determines that the emergency avoidance assistance is needed, for example, in a case where the distance between the host vehicle M and the obstacle in the front-rear direction of the host vehicle M becomes less than a second distance threshold. The emergency avoidance assistance determination unit 15 determines that the emergency avoidance assistance is not needed in a case where the distance between the host vehicle M and the obstacle in the front-rear direction of the host vehicle M is equal to or greater than the second distance threshold. The second distance threshold is a threshold set in advance as a value smaller than the first distance threshold. The value of the second distance threshold may be changed depending on the vehicle speed of the host vehicle M, or the like or may be a greater value when the vehicle speed of the host vehicle M is higher. In this case, the first distance threshold becomes a large value in conformity with the vehicle speed of the host vehicle M.

The emergency avoidance assistance determination unit 15 may use the time to collision between the host vehicle M and the obstacle, instead of the distance between the host vehicle M and the obstacle. The emergency avoidance assistance determination unit 15 determines that the emergency avoidance assistance is needed, for example, in a case where the distance between the host vehicle M and the obstacle in the front-rear direction of the host vehicle M becomes less than a second TTC threshold. The emergency avoidance assistance determination unit 15 determines that the emergency avoidance assistance is not needed in a case where the distance between the host vehicle M and the obstacle in the front-rear direction of the host vehicle M is equal to or greater than the second TTC threshold. The second TTC threshold is a threshold set in advance as a value smaller than the first TTC threshold. In addition, the emergency avoidance assistance determination unit 15 may perform determination using the time headway between the host vehicle M and the obstacle in the front-rear direction of the host vehicle M.

In a case where the early avoidance assistance determination unit 14 determines that the early avoidance assistance is needed, the collision avoidance assistance execution unit 16 executes the early avoidance assistance between the host vehicle M and the obstacle (the obstacle subjected to the determination). The collision avoidance assistance execution unit 16 transmits the control signal to the actuator 3, thereby executing the early avoidance assistance.

As the early avoidance assistance, steering avoidance with steering of the host vehicle M or deceleration of the host vehicle M is performed. In the early avoidance assistance, the steering avoidance with a steering amount smaller than in the emergency avoidance assistance or the deceleration with a deceleration amount smaller than in the emergency avoidance assistance is performed. That is, in the collision avoidance assistance execution unit 16, it is possible to determine the need for the early avoidance assistance early. For this reason, it is possible to achieve the collision avoidance between the host vehicle M and the obstacle with a small amount of assistance with sufficient time. Both of the steering avoidance of the host vehicle M and the deceleration of the host vehicle M may be executed as the early avoidance assistance.

In a case where the emergency avoidance assistance determination unit 15 determines that the emergency avoidance assistance is needed, the collision avoidance assistance execution unit 16 executes the emergency avoidance assistance between the host vehicle M and the obstacle (the obstacle subjected to the determination). The collision avoidance assistance execution unit 16 transmits the control signal to the actuator 3, thereby executing the emergency avoidance assistance.

As the emergency avoidance assistance, steering avoidance with steering of the host vehicle M or deceleration of the host vehicle M is performed. In the emergency avoidance assistance, steering avoidance with a steering amount greater than in the early avoidance assistance or deceleration with a deceleration amount greater than in the emergency avoidance assistance is performed. At the timing at which determination is made that the emergency avoidance assistance is needed, the distance between the host vehicle M and the obstacle is short compared to the timing at which determination is made that the early avoidance assistance is needed, and the amount of assistance becomes greater. Both of the steering avoidance of the host vehicle M and the deceleration of the host vehicle M may be executed as the emergency avoidance assistance.

Processing of Collision Avoidance Assistance Device of First Embodiment

Figure 3:
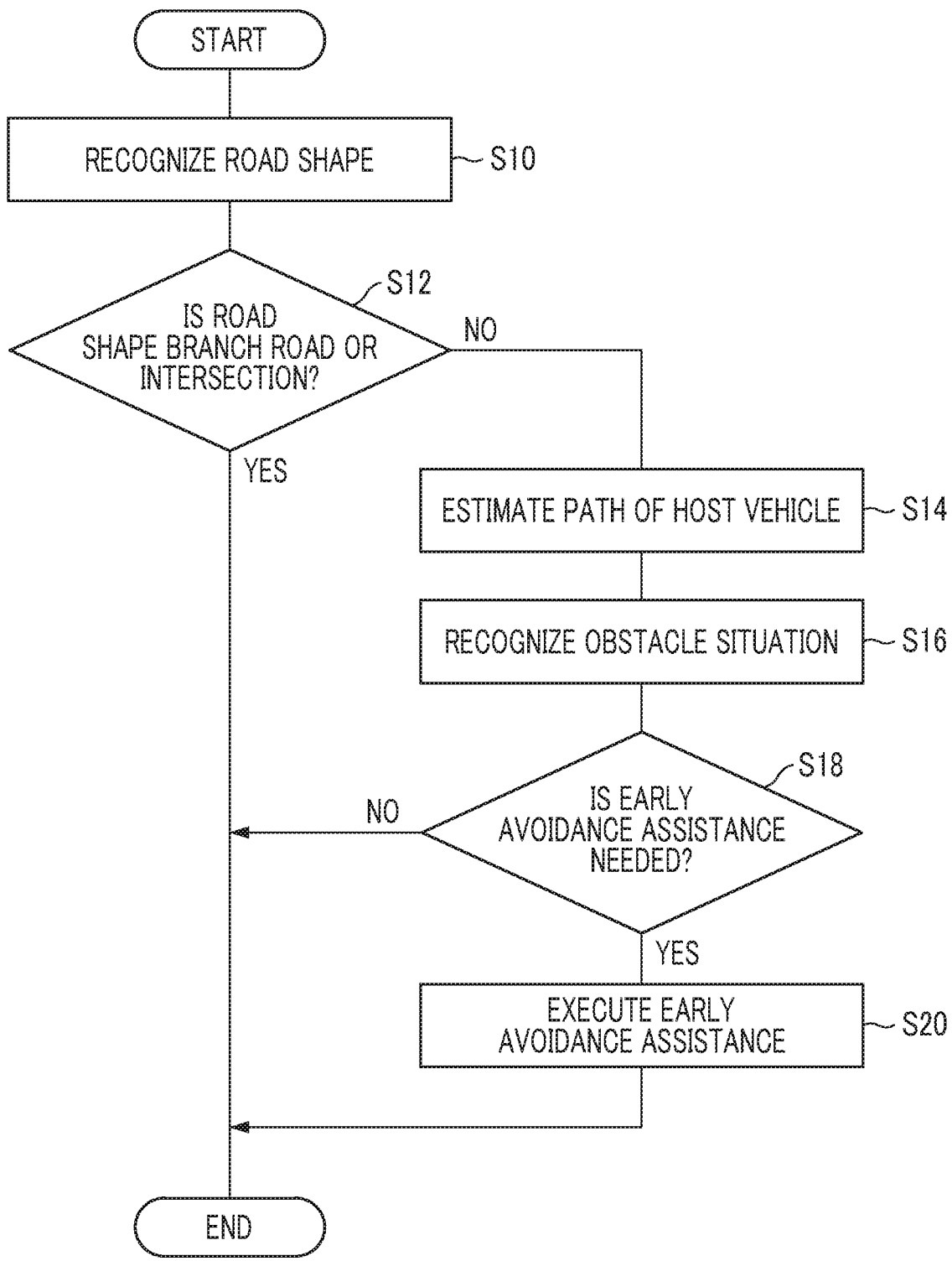
FIG. 3 is a flowchart showing an example of early avoidance assistance processing in the first embodiment.

Next, processing of the collision avoidance assistance device 100 of the first embodiment will be described referring to the drawings. FIG. 3 is a flowchart showing an example of early avoidance assistance processing in the first embodiment. The early avoidance assistance processing is executed, for example, during traveling of the host vehicle M.

As shown in FIG. 3, as S10, the ECU 10 of the collision avoidance assistance device 100 recognizes the road shape of the traveling road of the host vehicle M with the road shape recognition unit 11. The road shape recognition unit 11 recognizes the road shape of the traveling road, for example, based on the detection result of the external sensor 1.

In S12, the ECU 10 determines whether or not the road shape, on which the host vehicle M travels, is a branch road or an intersection with the road shape recognition unit 11. In a case where determination is made that the road shape, on which the host vehicle M travels, is a branch road or an intersection (S12: YES), the ECU 10 ends the present processing. Thereafter, the ECU 10 repeats the processing from S10 again when a given time elapses. In a case where determination is made that the road shape, on which the host vehicle M travels, is not a branch road or an intersection (S12: NO), the ECU 10 progresses to S14.

In S14, the ECU 10 estimates the path $C_M$ of the host vehicle M with the path estimation unit 12. The path estimation unit 12 estimates the path $C_M$ of the host vehicle M based on the road shape detected by the road shape recognition unit 11.

In S16, the ECU 10 recognizes the obstacle situation surrounding the host vehicle M with the obstacle situation recognition unit 13. The obstacle situation recognition unit 13 recognizes the obstacle situation surrounding the host vehicle based on the detection result of the external sensor 1. The processing order of S14 and S16 is not limited, and S14 and S16 may be reversed or may be executed simultaneously. An aspect in which the processing of S14 or S16 is executed regardless of the determination result of S12 may be made.

In S18, the ECU 10 determines the need for the early avoidance assistance for avoiding collision between the host vehicle M and the obstacle with the early avoidance assistance determination unit 14. The early avoidance assistance determination unit 14 determines the need for the early avoidance assistance based on the path $C_M$ of the host vehicle M estimated by the path estimation unit 12 and the obstacle situation recognized by the obstacle situation recognition unit 13. The early avoidance assistance determination unit 14 determines that the early avoidance assistance is needed, for example, in a case where the distance between the host vehicle M and the obstacle on the path $C_M$ of the host vehicle M becomes less than the first TTC threshold. The early avoidance assistance determination unit 14 determines that the early avoidance assistance is not needed in a case where the distance between the host vehicle M and the obstacle on the path $C_M$ of the host vehicle M is equal to or greater than the first TTC threshold.

In a case where determination is made that the early avoidance assistance is needed (S18: YES), the ECU 10 progresses to S20. In a case where determination is made that the early avoidance assistance is not needed (S18: NO), the ECU 10 ends the present processing. Thereafter, the ECU 10 repeats the processing from S10 again when a given time elapses.

In S20, the ECU 10 executes the early avoidance assistance with the collision avoidance assistance execution unit 16. The collision avoidance assistance execution unit 16 transmits the control signal to the actuator 3, thereby executing the early avoidance assistance.

Figure 4:
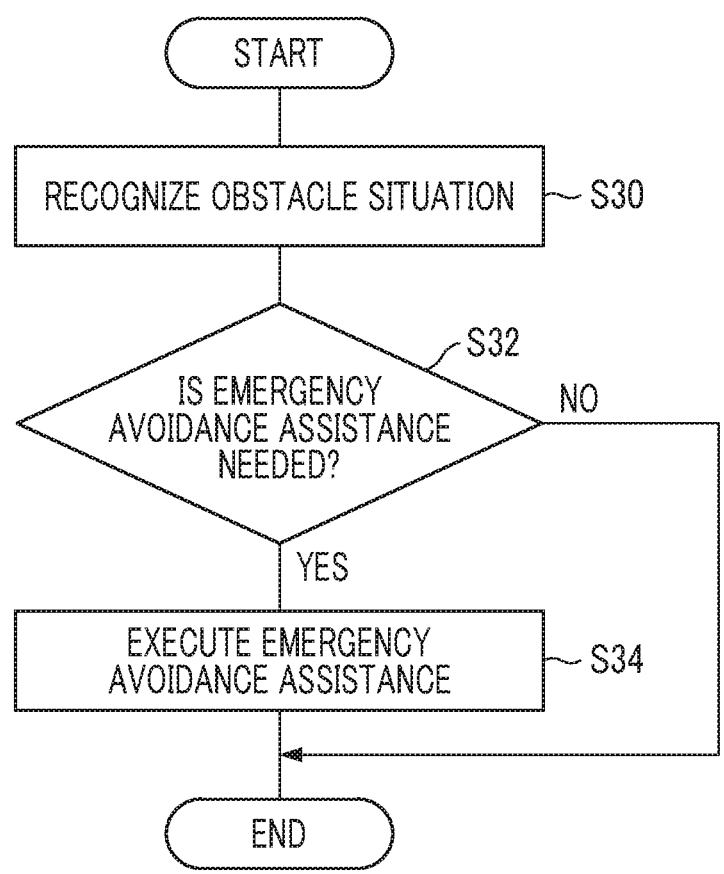
FIG. 4 is a flowchart showing an example of emergency avoidance assistance processing in the first embodiment.

FIG. 4 is a flowchart showing an example of emergency avoidance assistance processing in the first embodiment. The emergency avoidance assistance processing is executed, for example, during traveling of the host vehicle M. The emergency avoidance assistance processing is executed independently of the early avoidance assistance processing.

As shown in FIG. 4, as S30, the ECU 10 recognizes the obstacle situation surrounding the host vehicle M with the obstacle situation recognition unit 13. The obstacle situation recognition unit 13 recognizes the obstacle situation surrounding the host vehicle M based on the detection result of the external sensor 1.

In S32, the ECU 10 determines the need for the emergency avoidance assistance for avoiding collision between the host vehicle M and the obstacle with the emergency avoidance assistance determination unit 15. The emergency avoidance assistance determination unit 15 determines the need for the emergency avoidance assistance based on the obstacle situation. The emergency avoidance assistance determination unit 15 determines that the emergency avoidance assistance is needed, for example, in a case where the distance between the host vehicle M and the obstacle in the front-rear direction of the host vehicle M becomes less than the second TTC threshold. The emergency avoidance assistance determination unit 15 determines that the emergency avoidance assistance is not needed in a case where the distance between the host vehicle M and the obstacle in the front-rear direction of the host vehicle M is equal to or greater than the second TTC threshold.

In a case where determination is made that the emergency avoidance assistance is needed (S32: YES), the ECU 10 progresses to S34. In a case where determination is made that the emergency avoidance assistance is not needed (S32: NO), the ECU 10 ends the present processing. Thereafter, the ECU 10 repeats the processing from S30 again when a given time elapses.

In the collision avoidance assistance device 100 according to the first embodiment described above, the road shape of the traveling road, on which the host vehicle M travels, is recognized, and the path $C_M$ of the host vehicle M is estimated based on the road shape. For this reason, it is possible to improve the estimation accuracy of the path $C_M$ of the host vehicle M and to appropriately execute the early avoidance assistance compared to a case in the related art without taking the road shape into consideration. Furthermore, in the collision avoidance assistance device 100, the estimation accuracy of the path $C_M$ of the host vehicle M is improved taking the road shape into consideration, whereby erroneous assistance of collision avoidance of the host vehicle M to an obstacle or the like outside the traveling road is suppressed. For this reason, it is also possible to execute early assistance while relaxing a determination condition compared to the related art.

With the collision avoidance assistance device 100, the need for the emergency avoidance assistance is determined after the determination of the early avoidance assistance, and in a case where determination is made that the emergency avoidance assistance is needed, the emergency avoidance assistance is executed. For this reason, it is possible to execute the emergency avoidance assistance to appropriately assist the collision avoidance when another vehicle or the like suddenly runs out in front of the host vehicle M.

In addition, with the collision avoidance assistance device, on a branch road or at an intersection that affects the path estimation of the host vehicle M from the road shape, the early avoidance assistance is not executed, whereby it is possible to suppress execution of erroneous early avoidance assistance.

Second Embodiment

Figure 5:
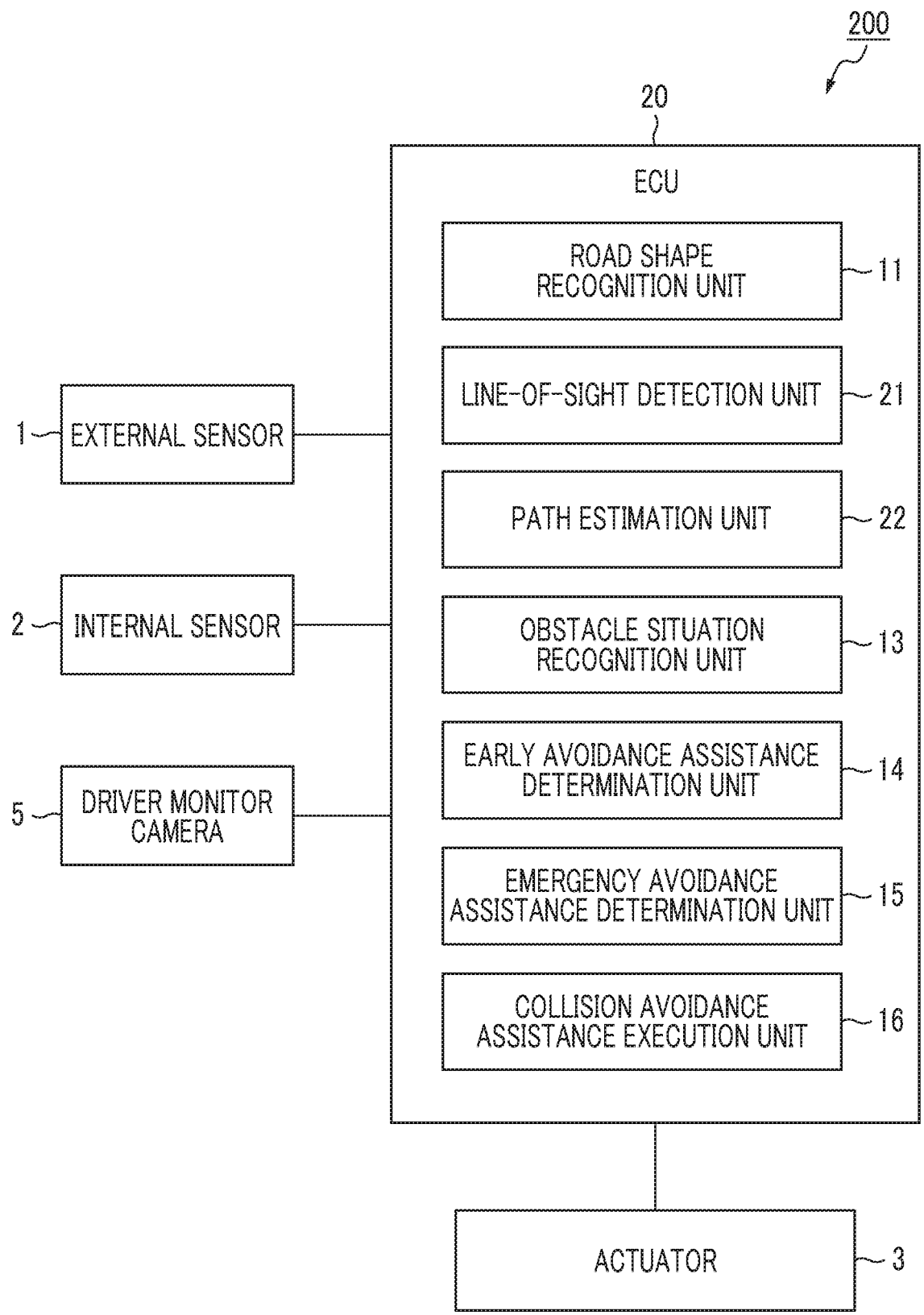
FIG. 5 is a block diagram showing a collision avoidance assistance device according to a second embodiment.

Subsequently, a collision avoidance assistance device according to a second embodiment will be described referring to the drawings. FIG. 5 is a block diagram showing a collision avoidance assistance device 200 according to the second embodiment. The collision avoidance assistance device 200 shown in FIG. 5 is different from the first embodiment in that the early avoidance assistance can be executed even in a case where the road shape is a branch road or an intersection. The same configurations as in the first embodiment are represented by the same reference numerals, and overlapping description will not be repeated.

Configuration of Collision Avoidance Assistance Device of Second Embodiment

As shown in FIG. 5, an ECU 20 of the collision avoidance assistance device 200 is different from the first embodiment in that the ECU 20 is connected to the driver monitor camera 5 and has a line-of-sight detection unit 21, and a path estimation unit 22 has a different function.

The driver monitor camera 5 is imaging equipment that images a driver. The driver monitor camera 5 is provided, for example, at a position in front of the driver on a cover of a steering column of the vehicle, and images at least a face of the driver. A plurality of driver monitor cameras 5 may be provided in order to image the driver from a plurality of directions. The driver monitor camera 5 transmits imaging information of the driver to the ECU 20.

The line-of-sight detection unit 21 detects a line of sight of the driver based on the imaging information of the driver with the driver monitor camera 5. The line-of-sight detection unit 21 performs prescribed image processing on the imaging information of the driver, thereby detecting the line of sight of the driver.

The path estimation unit 22 estimates the path $C_M$ of the host vehicle M based on the road shape detected by the road shape recognition unit 11 and the line of sight of the driver detected by the line-of-sight detection unit 21. In a case where the road shape, on which the host vehicle M travels, is not a branch road or an intersection, the path estimation unit 22 estimates the path $C_M$ assuming that the host vehicle M travels along the traveling road.

In a case where the road shape, on which the host vehicle M travels, is a branch road or an intersection, since the path $C_M$ cannot be estimated solely with the road shape, the path estimation unit 22 presumes a road, on which the host vehicle M moves, using the line of sight of the driver and estimates the path $C_M$ of the host vehicle M assuming that the host vehicle M travels along the road. The path estimation unit 22 presumes that the host vehicle M moves, for example, on a road to be closely observed by the driver for a given time or more. In a case where a blinker of the host vehicle M is operated, the path estimation unit 22 may select a road, on which the host vehicle M moves, based on a lighting direction of the blinker. The path estimation unit 22 may select a road, on which the host vehicle M moves, based on change in yaw rate of the host vehicle M.

Processing of Collision Avoidance Assistance Device of Second Embodiment

Figure 6:
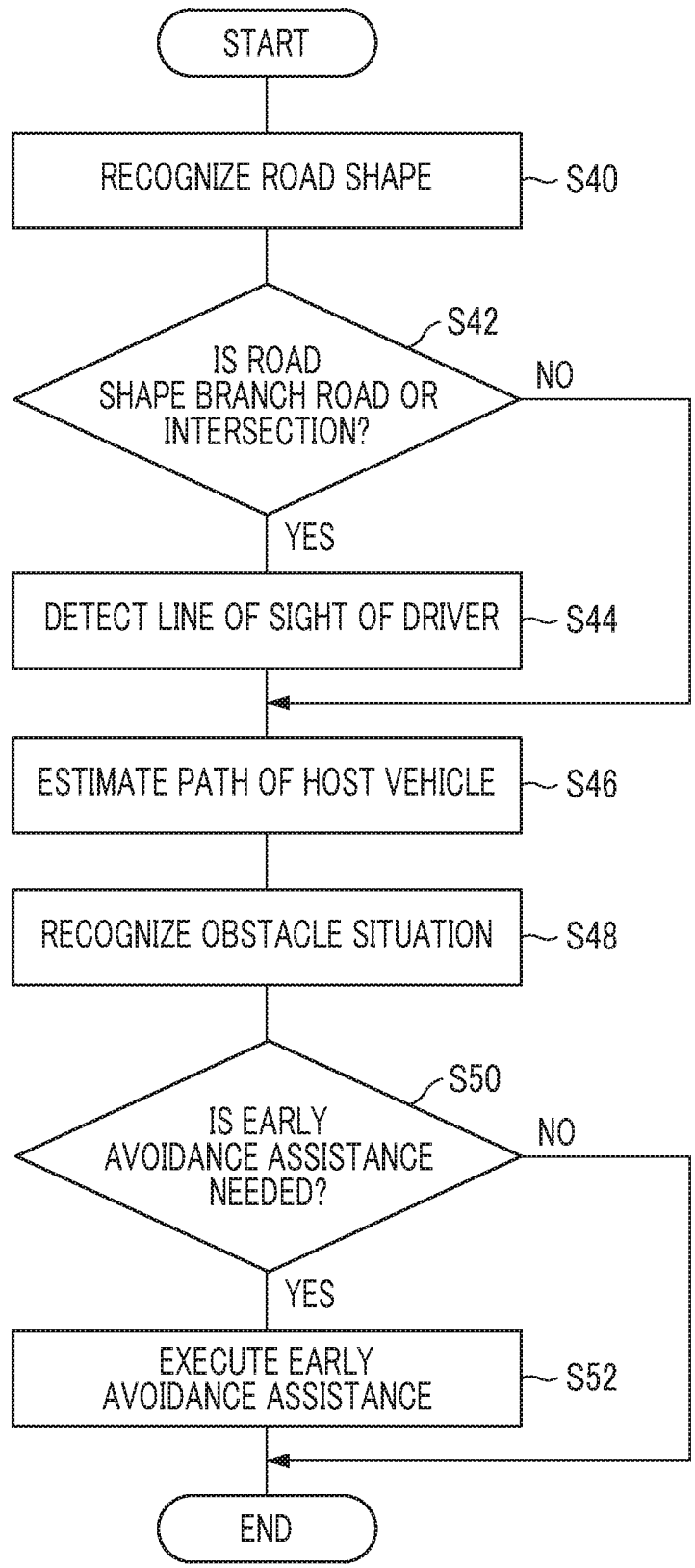
FIG. 6 is a flowchart showing an example of early avoidance assistance processing in the second embodiment.

Processing of the collision avoidance assistance device 200 of the second embodiment will be described. FIG. 6 is a flowchart showing an example of early avoidance assistance processing in the second embodiment. The early avoidance assistance processing is executed, for example, during traveling of the host vehicle M. The emergency avoidance assistance processing can be the same as in the first embodiment.

As shown in FIG. 6, as S40, the ECU 20 of the collision avoidance assistance device 200 recognizes the road shape of the traveling road of the host vehicle M with the road shape recognition unit 11.

Subsequently, as S42, the ECU 20 determines whether or not the road shape, on which the host vehicle M travels, is a branch road or an intersection with the road shape recognition unit 11. In a case where determination is made that the road shape, on which the host vehicle M travels, is a branch road or an intersection (S42: YES), the ECU 20 progresses to S44. In a case where determination is made that the road shape, on which the host vehicle M travels, is not a branch road or an intersection (S42: NO), the ECU 20 progresses to S46.

In S44, the ECU 20 detects the line of sight of the driver with the line-of-sight detection unit 21. The line-of-sight detection unit 21 detects the line of sight of the driver based on the imaging information of the driver from the driver monitor camera 5.

In S46, the ECU 20 estimates the path $C_M$ of the host vehicle M with the path estimation unit 22. In a case where the road shape, on which the host vehicle M travels, is not a branch road or an intersection, the path estimation unit 22 estimates the path $C_M$ from the road shape assuming that the host vehicle M travels along the traveling road. In a case where the road shape, on which the host vehicle M travels, is a branch road or an intersection, the path estimation unit 22 presumes a road, on which the host vehicle M moves, using the line of sight of the driver and estimates the path $C_M$ of the host vehicle M assuming that the host vehicle M travels along the road.

In S48, the ECU 20 recognizes the obstacle situation surrounding the host vehicle M with the obstacle situation recognition unit 13. The processing order of S46 and S48 is not limited, and S46 and S48 may be reversed or may be executed simultaneously.

In S50, the ECU 20 determines the need for the early avoidance assistance for avoiding collision between the host vehicle M and the obstacle with the early avoidance assistance determination unit 14. The early avoidance assistance determination unit 14 determines the need for the early avoidance assistance based on the path $C_M$ of the host vehicle M estimated by the path estimation unit 22 and the obstacle situation recognized by the obstacle situation recognition unit 13. In a case where determination is made that the early avoidance assistance is needed (S50: YES), the ECU 20 progresses to S52. In a case where determination is made that the early avoidance assistance is not needed (S50: NO), the ECU 20 ends the present processing. Thereafter, the ECU 20 repeats the processing from S40 again when a given time elapses.

In S52, the ECU 20 executes the early avoidance assistance with the collision avoidance assistance execution unit 16. The collision avoidance assistance execution unit 16 transmits the control signal to the actuator 3, thereby executing the early avoidance assistance.

With the collision avoidance assistance device 200 according to the second embodiment described above, the line of sight of the driver is detected even on a branch road or at an intersection, whereby it is possible to estimate the path of the host vehicle M. For this reason, it is possible to appropriately determine the need for the early avoidance assistance.

Although the embodiments have been described above, the disclosure is not limited to the above-described embodiments. The disclosure may be subjected to various modifications and improvements based on common knowledge of those skilled in the art including the above-described embodiment.

For example, the emergency avoidance assistance determination unit 15 may determine the need for the emergency avoidance assistance based on the distance between the host vehicle M and the obstacle on the whole circumference of the host vehicle M, instead of the distance between the host vehicle M and the obstacle in the front-rear direction of the host vehicle M. The same applies to a case where the time to collision or the time headway is used instead of the distance.

The collision avoidance assistance device 100 or 200 does not necessarily execute the emergency avoidance assistance. In this case, the collision avoidance assistance device 100 or 200 does not need to have the emergency avoidance assistance determination unit 15.

The collision avoidance assistance device 100 or 200 does not necessarily determine whether or not the road shape is a branch road or an intersection. The collision avoidance assistance device 100 or 200 may estimate the path, for example, assuming that a road closest to the host vehicle M in an extension direction of the traveling road is a road, on which the host vehicle M moves, or may estimate a path for each of a plurality of roads to be an exit of a branch road or an intersection.

What is claimed is:

1. A collision avoidance assistance device that executes assistance of collision avoidance between a host vehicle and an obstacle during traveling of the host vehicle based on a driving operation of a driver, the collision avoidance assistance device comprising:

an electronic control unit configured to:

recognize a road shape of a traveling road, on which the host vehicle travels;

estimate a path of the host vehicle based on the road shape;

recognize an obstacle situation surrounding the host vehicle including at least a relative position of the obstacle with respect to the host vehicle;

determine a need for early avoidance assistance for avoiding collision between the host vehicle and the obstacle from a distance between the host vehicle and the obstacle on the path of the host vehicle based on the path of the host vehicle and the obstacle situation;

execute the early avoidance assistance in a case where the electronic control unit determines that the early avoidance assistance is needed; and prohibit the execution of the early avoidance assistance regardless of a determination result of the electronic control unit in a case where the road shape is a branch road or an intersection.

2. The collision avoidance assistance device according to claim 1, wherein the electronic control unit is configured to determine a need for emergency avoidance assistance from a distance between the obstacle and the host vehicle in a longitudinal direction of the host vehicle based on the obstacle situation, wherein:

the electronic control unit is configured to execute the emergency avoidance assistance in a case where the electronic control unit determines that the emergency avoidance assistance is needed; and a distance between the host vehicle and the obstacle when the electronic control unit determines that the emergency avoidance assistance is needed is a distance shorter than a distance when the electronic control unit determines that the early avoidance assistance is needed in a case where a relative speed between the host vehicle and the obstacle is the same.

3. The collision avoidance assistance device according to claim 1, wherein the electronic control unit is configured to detect a line of sight of the driver, and, in a case where the road shape is a branch road or an intersection, the electronic control unit is configured to estimate the path of the host vehicle based on the line of sight of the driver.

* * * * *